Feb. 22, 1955    M. D. BASOLO ET AL    2,702,716
SLIT SOCKET CLAMPED JOINT WITH COMPRESSED GASKET
Filed Aug. 26, 1952
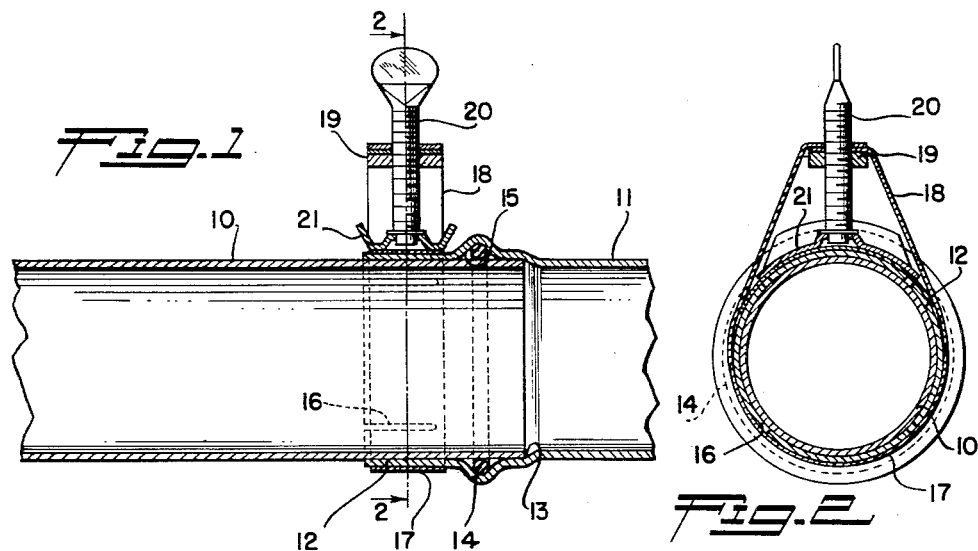
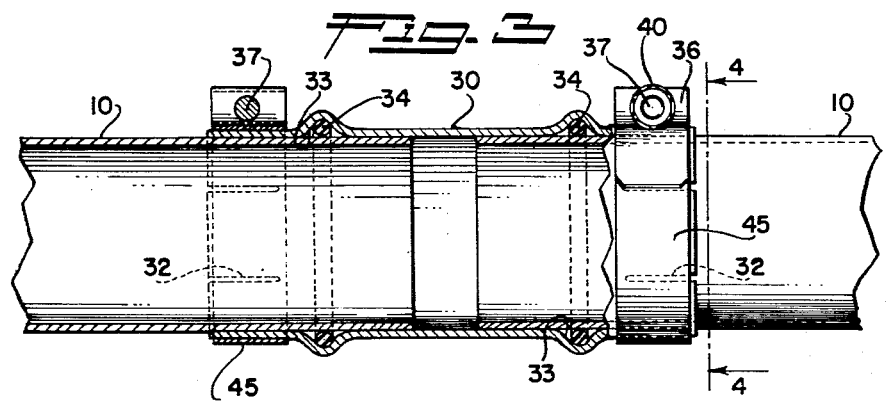
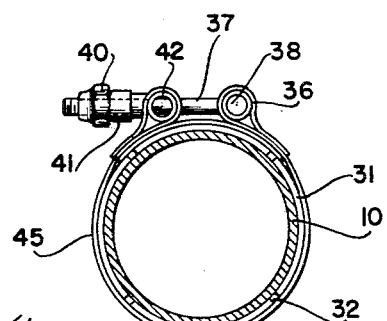
INVENTORS
MENOTO D. BASOLO
CLAIR D. SPRAGUE
By George C. Sullivan
Agent

United States Patent Office 2,702,716
Patented Feb. 22, 1955

2,702,716

SLIT SOCKET CLAMPED JOINT WITH COMPRESSED GASKET

Menoto D. Basolo and Clair D. Sprague, Burbank, Calif., assignors to Lockheed Aircraft Corporation, Burbank, Calif.

Application August 26, 1952, Serial No. 306,318

2 Claims. (Cl. 285—164)

This invention relates to joints or couplings for fluid conductors and relates more particularly to joints for tubing, such as used in aircraft, and the like. It is a general object of the invention to provide tubing joints or couplings of this kind that are simple, inexpensive, and light in weight.

There are many situations in airplanes where fluids, such as air, water, fuel, etc. are conducted, at relatively low pressures, through tubing systems. In the past, it has been the usual practice to employ standard or conventional unions, and the like, to connect the sections of such tubing. The conventional tube couplings and the unions embody a considerable number of machined parts and are, therefore, expensive to manufacture and somewhat complicated to install and are bulky and heavy in weight. Furthermore, the usual unions and couplings do not have full diametered passages but constitute restrictions or areas of reduced diameter in the fluid lines.

Another object of the invention is to provide tubing joints that embody or require a minimum of parts and, therefore, are light in weight and inexpensive. In accordance with our invention a simple seal ring or O ring directly engages between the surfaces of telescopically related portions of the tubes themselves and an appropriate clamp serves to clamp one tube onto the other to mechanically connect the tubes. The seal ring and the clamp are the only parts required or employed in addition to the tubes themselves.

Another object of the invention is to provide tubing joints of this type that are extremely easy to assemble or install. In employing the coupling or joint of the invention a plain end portion of one tubing section or length of tubing is merely slid or introduced into a slightly enlarged end portion of the other section of tubing to engage through an O ring therein and the clamp is then actuated or tightened around said enlarged portion, which is preferably slit lengthwise, to secure or clamp the sections together. All that is required is to slide one tube within the other and then actuate the clamp. Where the clamp is hand or manually actuated no tools whatsoever are needed while in other cases only a simple hand tool is needed to actuate or tighten the clamp.

A further object of the invention is to provide a tubing joint of the character described that provides or preserves a full diametered unrestricted fluid passage through the tubing assembly. As above noted the end portion of one tubing section is plain and of full uniform diameter and this tubing fits within the slightly enlarged portion of the other tubing to be flush with the internal surface of the remainder of said other tubing. Thus the passageway through the joint is unobstructed and of full uniform diameter.

A still further object is to provide a "union" type fitting or joint wherein the joint or union member may be slid back on either of the tubing sections. This allows the joint to be made up and disconnected without disturbing the other joints in the system or line.

Other objectives and features of the invention will become apparent from the following detailed description of typical preferred embodiments throughout which reference will be made to the accompanying drawings, wherein:

Figure 1 is a longitudinal detailed sectional view of one form of tubing joint of the invention;

Figure 2 is a transverse detailed sectional view taken as indicated by line 2—2 on Figure 1;

Figure 3 is a longitudinal detailed sectional view of a double joint or union of the invention incorporating a slightly different form of clamp means and showing a portion of the assembly in side elevation; and Figure 4 is a transverse detailed sectional view taken substantially as indicated by line 4—4 on Figure 3 showing the clamp in end elevation.

Figures 1 and 2 of the drawings illustrate the invention employed to join or couple two lengths of tubing 10 and 11 of the type used extensively in airplanes. The tubing has relatively thin walls and, in practice, is often constructed of an aluminum alloy. The tube 10 is plain and of uniform diameter both internally and externally. The tube 11, which is usually of the same material and the same diameter as the tube 10, is provided at its end with a region or portion 12 of enlarged diameter. This portion 12 is enlarged to receive the end part of the tube 10 and, in practice, the parts are related so that the tubing 10 may be manually slid into the enlarged portion 12 to closely fit therein. It is to be noted that the tubes 10 and 11 have relatively thin walls so that it is not necessary to materially increase the diameter of the portion 12 to receive the tube 10. A shallow shoulder 13 is present in the tubing 11 where the enlarged portion 12 joins or merges with the main body of the tubing. It is preferred to bring the end or extremity of the tubing 10 against or immediately adjacent this shoulder 13 so that the internal wall of the tubing 10 is flush with the internal wall or surface of the tubing 11 to provide for the free, unrestricted flow of fluid from one tube to the other. As will be seen from an inspection of Figure 1, the fluid passage through the coupling or joint is free, clear and unobstructed and is of uniform diameter except for the very minor annular groove at the shoulder 13. If desired, the shoulder 13 may be formed to conform with the end of the tubing 10 although in most cases it will be preferred to have some curvature or radii at the shoulder 13, as illustrated.

In order to effect and insure a fluid-tight seal between the overlapping or telescoping portions of the tubings 10 and 11, a sealing ring 14 is provided in the tube portion 12. This portion 12 is formed or provided with an internal annular groove 15 for containing or receiving the seal ring 14. The groove 15 may be easily formed with or by a beading tool, or the like, at the time the portion 12 is enlarged in diameter, it being apparent that the portion 12 may be enlarged and the groove 15 formed by any suitable or selected method that merely shapes or forms the wall of the tubing 11 without machining or cutting the same. The seal ring 14 is preferably what is known as an O ring, being a continuous one-piece member of rubber, synthetic rubber, rubber composition, or the like, of round transverse cross section. The ring 14 is proportioned to be compressed slightly in the radial direction when the tube 10 is slid into the enlarged portion 12 of the tube 11 so as to have effective sealing engagement between the tubes. However, the relationship is such that there is no possibility of the ring 14 being displaced or pushed from the groove 15 when the tubes are assembled.

Clamp means is provided to tighten the split end portion 12 of the tube 11 onto the tube 10. The portion 12 has a plurality of circumferentially spaced cuts or slits 16 extending axially from its end toward the groove 15 so as to be radially flexible and compressible. There may be one, two, three, four or more slits 16. The clamp means engages about the slit portion 12 and serves to tighten it onto the tube 10. In Figures 1 and 2 we have shown a clamp including a flexible metal strap 17 engaging about the slit portion 12 and having outwardly converging parts 18 welded or otherwise secured to a nut 19. A thumb-screw 20 is threaded through the nut 19 and has a curved or arcuate pressure foot 21 for cooperating with the exterior of the tube portion 12 in the area between the strap portions 18. It will be seen that by tightening down the clamp screw 20 the clamp is actuated to compress the slit tube portion 12 so as to grip the tube 10. In practice, the joint constructed as just described will withstand an internal fluid pressure of several hundred p. s. i.

In Figures 3 and 4 we have illustrated a joint or union of the invention for connecting two plain tubes 10. It will be observed that the spaced opposing ends of the tubes 10 are each of uniform internal and external diameter. The coupling, joint or union includes a tubing body 30 which is constructed or formed of a piece or section of tubing stock slightly larger in diameter than the sections 10. The relationship of the tubing sections 10 and the body 30 is such that the body 30 may be slid along or over the sections 10. The union body 30 has substantially the same internal diameter as the external diameter of the tubes 10. The end portions of the body 30 snugly receive the end parts of the tubes 10 and have spaced longitudinal cuts or slits 32 so as to be radially compressible. Annular internal grooves 33 are provided in the body 30 some distance inwardly from its opposite ends and may be substantially the same as the groove 15 of Figure 1. These grooves 33 receive or contain seal rings or O rings 34 of rubber, synthetic rubber, rubber composition, or the like, for sealing between the body 30 and the tubes 10.

Clamps are provided on the slit end portion of the body 30 to compress them onto the tubes 10 and thus secure together the union assembly. These clamps, as illustrated, include flexible metal straps 45 engaged about the enlarged union body 30 and provided at their ends with split loops 36. T bolts 37 are provided to tighten the straps 45. Each bolt 37 has a head or cross rod 38 engaged in one of the loops 36 of its respective strap 45 and has a nut 40 on its other end for cooperating with a sleeve 41 which, in turn, engages a bushing 42 in the other loop 36 of the strap. By tightening down the nuts 40 the straps 45 are contracted to compress the split ends of the body 30 onto the plain tubes 10. If desired, clamps, such as shown in Figures 1 and 2, may be employed on the joint structures of Figures 3 and 4 and in a like manner the coupling or joint of Figures 1 and 2 may embody the type of clamp illustrated in Figures 3 and 4. It is to be observed that with the clamps loose, the body 30 may be slid onto or along one tubing section 10 to permit the other section to be brought into proper position in the line or to be moved out of position as desired. This greatly facilitates the making up and disconnecting of the tubing system or line.

From the foregoing detailed description it will be seen that we have provided extremely simple inexpensive lightweight tubing joints and unions. They embody a minimum number of parts, the only elements required in addition to the tubes themselves being the seal rings 14 or 34 and the appropriate clamps. It will be noted that the tubes or tubing themselves form the bodies of the joints, eliminating the necessity for the usual union or coupling bodies, glands, nuts, etc. as found in conventional joints, couplings and unions. The joints necessitate no restrictions in the lines so that a free unimpeded flow of fluid is assured. The joints are small in size and, therefore, well adapted for situations where the available space is limited. Furthermore the joints are easily assembled and actuated even in confined inaccessible situations.

Having described only typical forms of the invention we do not wish to be limited to the specific details herein set forth, but wish to reserve to ourselves any variations or modifications that may appear to those skilled in the art and fall within the scope of the following claims.

We claim:

1. A tube joint comprising two thin-walled tubular members having walls of substantially the same thickness, one of said tubular members having an internal diameter at one end at least as great as the external diameter of the other tubular member so that the former tubular member will telescope over the latter tubular member, said latter tubular member being of constant diameter from one end to a substantial distance toward the other, said one end of said former tubular member being axially slotted, said slots opening at said one end and being substantially of equal length and spaced circumferentially and parallel to each other, said former tubular member having an external annular bead providing an internal annular recess in said tubular member, the outer edge of said bead being substantially axially adjacent the closed ends of said slots, a sealing ring seated in said recess having its internal diameter less than the internal diameter of said former tubular member, removable annular clamping means clamping said slotted end of said former tubular member rigidly against said latter tubular member and engaging the external surface of said former tubular member about its slotted end when said tubular members are telescoped together, said clamping means having its inner end substantially adjacent the outer edge of said bead, said outer edge of said bead being radially deformed by the pressure exerted by the clamping means so as to compress said sealing ring between said tubular members, said clamping means having a width at least equal to the length of said slots for exerting effective clamping pressure.

2. A joint for connecting two thin-walled tubes comprising a thin-walled tubular member of substantially the same thickness as said tubes, said tubular member having an internal diameter at its ends at least as great as the external diameter of the respective tubes so that said tubular member will telescope over the respective tubes, said tubes being of constant diameter from one end to a substantial distance toward the other, said tubular member being axially slotted at one end, said slots opening at said one end and being of equal length and spaced circumferentially and parallel to each other, said tubular member having an external annular bead providing an internal annular recess in said tubular member, the outer edge of said bead being substantially axially adjacent the closed end of said slots, said other end of said tubular member being similarly slotted, said similar slots opening at said other end and running axially substantially an equal distance and spaced circumferentially and parallel to each other, said tubular member having a second annular bead providing a second internal annular recess in said tubular member, the outer edge of said second annular bead being substantially axially adjacent the closed end of said similar slots, sealing rings seated in said recesses having their internal diameters less than the internal diameter of said tubular member, removable annular clamping means clamping said slotted ends of said tubular member rigidly against said tubes and engaging the external surface of said tubular member about its slotted ends when said tubular member and said tubes are telescoped together, said clamping means having its inner ends substantially adjacent the outer edges of said beads, said outer edges of said beads being radially deformed by the pressure exerted by the clamping means so as to compress said sealing rings between said tubular member and said tubes, said clamping means having a width at least equal to the length of said slots for exerting effective clamping pressure.

References Cited in the file of this patent

UNITED STATES PATENTS

| Number | Name | Date |
| --- | --- | --- |
| 642,188 | Weston et al. | Jan. 30, 1900 |
| 1,473,537 | Bailey | Nov. 6, 1923 |
| 1,790,111 | Pike | Jan. 27, 1931 |
| 1,953,120 | Miller | Apr. 3, 1934 |
| 2,025,271 | Compo | Dec. 24, 1935 |
| 2,321,930 | Murray | June 15, 1943 |
| 2,426,423 | Woolsey | Aug. 26, 1947 |
| 2,457,105 | Patterson | Dec. 21, 1948 |
| 2,515,899 | Sanger-Stevens | July 18, 1950 |
| 2,531,401 | Clerke | Nov. 28, 1950 |

FOREIGN PATENTS

| Number | Country | Date |
| --- | --- | --- |
| 281,769 | Italy | Aug. 31, 1929 |
| 85,860 | Austria | Oct. 10, 1921 |